(12) United States Patent
Bentz et al.

(10) Patent No.: US 7,311,209 B2
(45) Date of Patent: *Dec. 25, 2007

(54) FILTER MATERIAL

(75) Inventors: Martin Bentz, Heidenheim (DE); Danny H. Meger, Gernsbach (DE)

(73) Assignees: Outlast Technologies, Inc, Boulder, CO (US); Schoeller + Hoesch GmbH & Co. KG, Gernsbach (DE)

( * ) Notice: Subject to any disclaimer, the term of this patent is extended or adjusted under 35 U.S.C. 154(b) by 252 days.

This patent is subject to a terminal disclaimer.

(21) Appl. No.: 10/937,045

(22) Filed: Sep. 9, 2004

(65) Prior Publication Data

US 2005/0061733 A1 Mar. 24, 2005

(30) Foreign Application Priority Data

Sep. 13, 2003 (DE) ............................... 103 42 416

(51) Int. Cl.
| | |
|---|---|
| *B65B 29/02* | (2006.01) |
| *B01D 71/26* | (2006.01) |
| *B01D 69/02* | (2006.01) |
| *D04H 1/00* | (2006.01) |
| *B32B 3/00* | (2006.01) |

(52) U.S. Cl. ...................... 210/503; 210/504; 210/505; 210/506; 210/507; 210/508; 162/129; 162/146; 162/157.5; 162/175; 162/185; 428/316; 428/198; 428/35.2; 442/401; 442/361; 442/381; 442/389; 426/84; 426/77

(58) Field of Classification Search ..................... None
See application file for complete search history.

(56) References Cited

U.S. PATENT DOCUMENTS 2,433,531 A    12/1947   Ryan et al.
4,289,580 A    9/1981   Elston et al.
4,756,958 A *  7/1988   Bryant et al. ............ 428/320.2
6,207,738 B1 * 3/2001   Zuckerman et al. ........ 524/156
6,565,710 B2 * 5/2003   Salow et al. ................ 162/175
7,135,424 B2 * 11/2006  Worley et al. .............. 442/131
2002/0034913 A1 3/2002  Curro et al.
2002/0124953 A1 9/2002  Sennett et al.
2003/0035951 A1 2/2003  Magill
2004/0089602 A1* 5/2004 Heinrich et al. ............ 210/505

FOREIGN PATENT DOCUMENTS

| | | |
|---|---|---|
| DE | 197 19 807 A 1 | 11/1998 |
| DE | 199 31 402 A 1 | 1/2001 |
| EP | 0 656 224 A1 | 5/1994 |
| EP | 0 632 163 A1 | 1/1995 |
| EP | 07328359 | 12/1995 |
| EP | 0 785 013 A1 | 7/1997 |
| EP | 1229 1661 A1 | 1/2001 |
| EP | 1215 134 A1 | 7/2001 |
| WO | WO 93/24241 | 12/1993 |
| WO | WO 03/070353 A2 * | 8/2003 |

* cited by examiner

*Primary Examiner*—Krishnan S. Menon
(74) *Attorney, Agent, or Firm*—Melvin K. Silverman; Yi Li

(57) ABSTRACT

A filter material has one or more plies of fiber layers, in particular for the production of filter bags and filter cones for infused beverages, the at least one fiber layer containing fibers or microcapsules having phase change material. Paraffinic hydrocarbons can be used as the phase change material.

25 Claims, 4 Drawing Sheets

FILTER MATERIAL

The invention relates to a filter material and a filter paper comprising one or more plies of fiber layers, in particular for the production of filter bags and filter cones for infused beverages, improved color and taste properties such that a bag produced therefrom and filled with the material to be infused supplies an infusion which has more color and aroma in a substantially shorter time than a bag that is known at present.

In general, a filter material is produced from natural fibers or a combination of natural fibers and synthetic fibers, using a special papermaking machine.

In a first step, an aqueous suspension of natural fibers is applied to a paper machine fabric, preferably set at an angle, the fiber suspension being led over first dewatering chambers. In the process, a first fiber layer is formed from the natural fibers on the moving fabric. In the case of the production of a heat-sealable filter material from natural fibers and synthetic fibers, in a second step the heat-sealable, synthetic fibers in a second aqueous suspension are deposited on the first layer of natural fibers during the onward movement of the paper machine fabric and then led jointly over further dewatering chambers. In the course of the onward movement of the paper machine fabric with the two fiber layers lying on each other, drying is then carried out, the synthetic fibers being fused to the first natural fiber layer and, as a result, partial penetration of the two layers occurring. The filter material has become heat-sealable.

On the papermaking machine, the drying can be carried out by means of cylinder contact drying or by means of through-drying with the aid of hot air.

Following the drying, the heat-sealable or non-heat-sealable filter material is rolled up, then cut to the required widths and finally shaped into bags on automatic packing machines and filled with a filling material, for example tea.

When the filter material is used as a bag for tea and other filling materials that can be extracted, fast infusion is desired.

In this case, it is usual to package tea having a high number of fine tea particles. If the tea filter material has a desired high porosity, that is a high number of holes, fine tea particles fall through the pores, which is extremely undesirable during the use and also during the transport of the bags.

One possibility of preventing this disadvantage is to configure the pores to be substantially smaller, more offset and more intertwined, so that the loss of tea dust is reduced. However, in this case the tea infusion decreases again.

In EP 0 656 224 A1 a tea filter material is described which comprises a base layer and a meltblown polymer layer. In this known tea filter material, the necessary pores are offset in relation to one another without substantial impairment to the infusion, so that the loss of tea dust is reduced.

According to U.S. Pat. No. 4,289,580, perforation of the filter material is carried out on the papermaking machine with the aid of water jets, in order to optimize the tea infusion.

In EP 1 229 166 A1 a method is described in which a filter material is made more capable of filtration by means of perforation and/or embossing.

In the tea filter papers used at present, however, without any movement of the bag in the infusion liquid, a high concentration of extracted tea builds up very quickly at the interface between water and filter paper. This high concentration (barrier concentration) hinders further infusion of the filling material, since the concentration gradient between the inside and the outside of the bag is not produced again without any movement of the bag.

Finally, EP 1 215 134 A1 contains a description of a filter material in which intumescent absorber fibers are incorporated. Filled teabags produced from this no longer have to be moved in the infusion liquid in order to ensure optimal infusion of the filling material.

As a result of the fiber swelling, micro-swirling is produced, which produces the necessary concentration gradient at the paper interface once more.

This micro-swirling assumes that the absorbing fibers must have a larger fiber diameter than the natural and polymer fibers that are usual for the production of the filter material. Incorporating the absorber fibers in the filter material and their fiber-fiber bonding therefore requires additional chemical and technical aids.

It is an object of the present invention to provide filter material which avoids the aforementioned disadvantages of the prior art, in particular with which fast infusion is achieved, specifically without fine tea particles passing through the filter material.

This means that microfibers or microcapsules are incorporated in the filter material according to the invention, with very small fiber dimensions which, on account of their composition, bring about micro-swirling in the infusion liquid by means of endothermic and exothermic reaction and in this way effect very fast interchange or infusion.

According to the invention, this object is achieved by the at least one fiber layer containing fibers or microcapsules having phase change materials.

A process for the production of a filter material according to the invention is described hereinafter in detail.

A teabag, tea filter, coffee bag or coffee filter is produced using the filter material and the method of the present invention.

The filter material according to the invention has in practice exhibited substantially faster infusion of the filling material to be extracted, specifically without the filling material particles passing through the filter material. In this way, considerably improved color and taste properties resulted, in such a way that, for example, a bag produced from said material and filled with a material to be infused supplies an infusion with a more intense color and aroma in a substantially shorter time than known filter bags during an infusion.

The fibers or microfibers or microcapsules according to the invention in the filter material have very small fiber dimensions or microcapsule sizes, which means that, although the passage of filter particles is prevented, at the same time an interchange of liquid is not hindered. Instead, the opposite is the case.

Fibers or microcapsules having phase change material are described, for example, in EP 0 611 330 B1 and U.S. 2003/0035951 A1. The intended purpose of the fibers or microcapsules is in this case woven and knitted fabrics with improved thermal properties for items of clothing. Items of clothing having these fibers or microcapsules absorb body heat which is produced and liberate it again when it is required. In this method, use is made of the physical effect that, at the phase change from solid to liquid, from liquid to gaseous and vice versa, thermal energy is liberated or is used up.

In a surprising way, it has been shown that fibers or micro-capsules of this type having phase change materials which are integrated into the filter material produce more intense suction or micro-swirling with regard to an infusion of the filtered material. It has been established that this functions virtually like a Gulf Stream or a large number of micro. Gulf Streams with a very fast infusion effect.

If the filter material according to the invention is intended to be used for the production of infused beverages, use will advantageously be made of phase change materials which have their phase change from solid to liquid in a range from 0 to 120° C., preferably 50 to 100° C.

Here, of course, this temperature range is to be seen only as an example. If the filter material according to the invention is used for other purposes, use will be made of phase change materials which have their phase change in a corresponding way in the temperature range matched to the material to be filtered.

An extremely wide range of materials can be used as the phase change materials, such as hydrocarbons, in particular paraffinic hydrocarbons.

In principle, however, a large number of materials can be used. In this regard, reference is made, for example, to the materials, examples and production methods described in U.S. 2003/0035951 A1, U.S. 2003/C035951 A1 and EP 0 611 330 B1 therefore also include the disclosure content for the present invention.

The following are mentioned as examples of phase change materials: hydrocarbons, hydrated salts, waxes, oils, fatty acids, fatty acid esters, dibasic acids, dibasic esters, primary alcohols, polyhydric alcohols, clathrates, semiclathrates, stearic anhydrides, ethylene carbonate, polymers and mixtures thereof.

The fibers or microcapsules having phase change materials can be present in an amount between 1 and 70% by weight, preferably 2 to 30% by weight or even more highly preferably between 3 and 10% by weight, based on the weight per unit area of the filter material.

The filter material according to the invention can have a weight per unit area between 8 and 90 $g/m^2$, preferably between 10 and 25 $g/m^2$. It can be produced in one ply or many plies. In the case of only one ply, this is preferably composed of softwood pulp and/or abaca fibers and a corresponding proportion of fibers or microcapsules having phase change material. In the case of a multi-ply design, as a material that can be heat-sealed, the second ply can be composed of heat-sealable polymer fibers.

In the process according to the invention, the fibers or microcapsules having phase change material can be added to the first ply produced on the papermaking machine. They can be used in a mixture with the natural fibers. However, it is also possible to add the fibers or microcapsules to the paper by means of an application apparatus in the papermaking machine, for example a size press.

Advantageous developments and refinements of the invention emerge from the remaining subclaims and also from the exemplary embodiment illustrated in principle below by using the drawing, in which:

For the purpose of illustration, the process according to the invention will be explained in more detail by using the figures on the example of a two-ply filter material.

Figure 1:
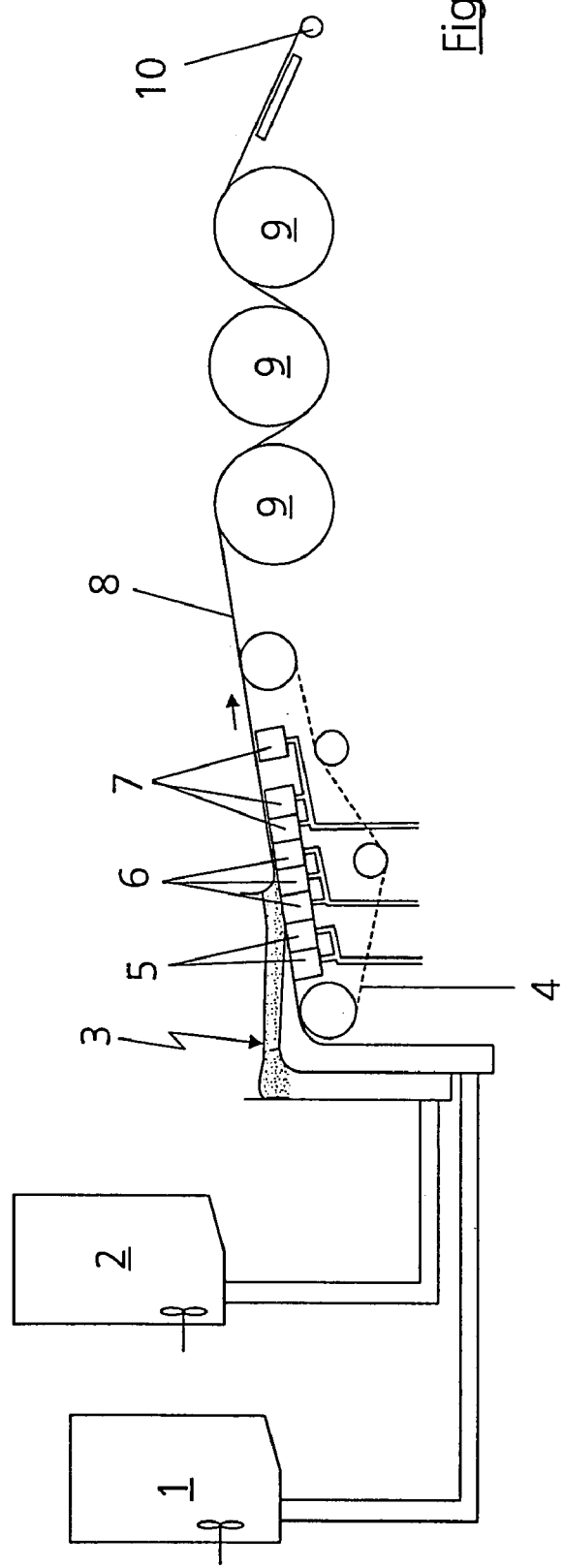
FIG. 1 shows the basic structure of a papermaking machine as can be used for the production of the filter material according to the invention.

According to FIG. 1, two fiber suspensions A and B from containers 1 and 2 are applied to a flow box 3 on a papermaking machine and are transported over a papermaking fabric 4 belonging to the papermaking machine in order to form paper material.

5, 6, 7 designate dewatering chambers, using which the water is extracted. The necessary pipework and pumping apparatus are not specifically illustrated. 8 shows the material then formed from natural and synthetic fibers. Natural fibers and water come from the container 1, synthetic fibers and water are added from the container 2.

The material is taken off the paper machine fabric and supplied to the drying. 9 shows schematically three drying cylinders, which dry the material in the contact process. However, it is also possible to lead the material over one cylinder and to dry it with the aid of hot air flowing through. Following drying, the filter material is reeled up onto a roll 10. Positioning is then carried out.

The fibers or microcapsules having phase change material can either already be added directly into the container 1 with the natural fibers during the production on the papermaking machine or else subsequently in an application device, for example a size press.

Advantageously, a binder, for example polyacrylate binder (Acronal®) will be added in order that the microcapsules or microfibers adhere to the desired fiber layer.

Figure 2:
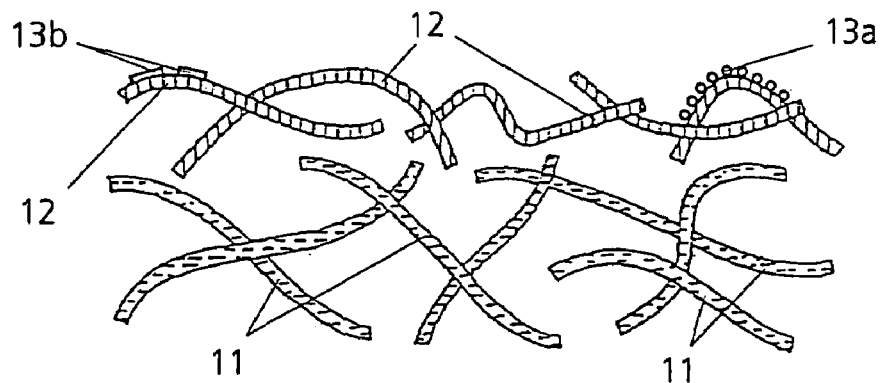
FIG. 2 shows a schematic illustration of the formation of the filter material according to the invention in a first step with formation of the first fiber layer of natural fibers and the formation of the second fiber layer of synthetic heat-sealable fibers.
Figure 3:
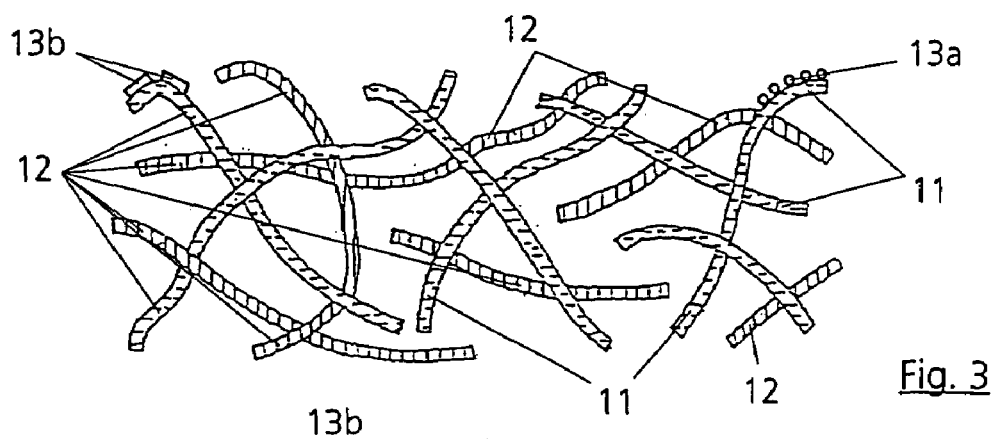
FIG. 3 shows a second step with partial penetration of the two fiber layers as a result of the dewatering described.
Figure 4:
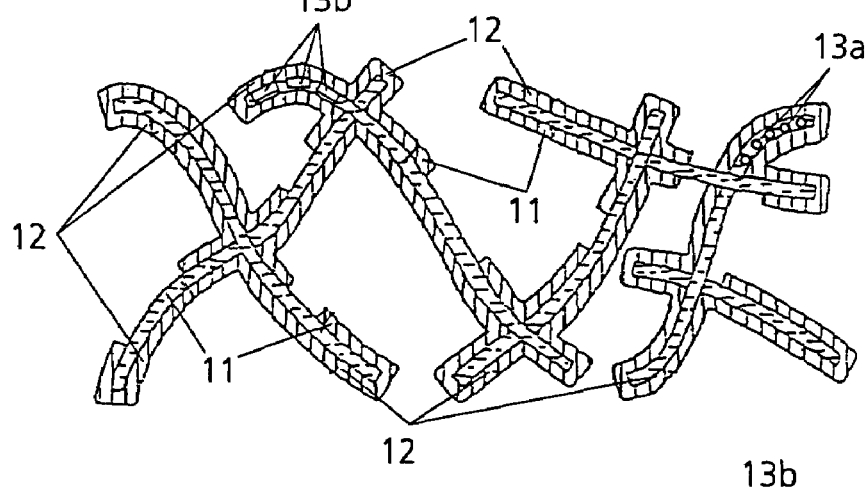
FIG. 4 shows a further step, the synthetic heat-sealable fibers melting as a result of drying and then partially enveloping the natural fibers.

FIGS. 2 to 4 show various steps relating to the formation of the filter material according to the invention in a schematic illustration.

FIG. 2 shows the formation of a first fiber layer 11 of natural fibers and the formation of a second fiber layer of synthetic heat-sealable fibers. In addition, microcapsules 13a or microfibers 13b having phase change material 14 are added. The microcapsules 13a or the microfibers 13b are applied to the natural fiber layer 11 via a binder.

FIG. 3 shows partial penetration of the fiber layers 11, 12.

FIG. 4 shows, in a further step, the bonding of the natural fiber layer 11 to the synthetic heat-sealable fiber layer 12 by means of drying. As can be seen, the synthetic heat-sealable fibers 12 partially envelop the natural fibers 11 and therefore also the microcapsules 13a or microfibers 13b having the phase change material 14.

Figure 5:
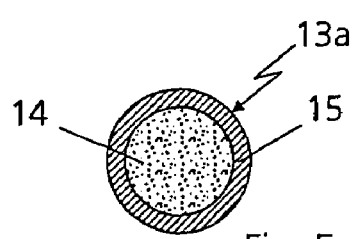
FIG. 5 shows a cross section through a microcapsule.

FIG. 5 shows schematically, in a much enlarged illustration, a microcapsule 13a. As can be seen, this has a protective sheath 15, in the interior of which there is the phase change material 14, for example paraffinic hydrocarbons. In general, a mixture of hydrocarbons with different chase changes is taken, in order that the widest possible temperature range is covered. A sheath of polyacrylate, for example, can be used as protective sheath.

The microcapsules are suspended in an aqueous acrylate solution and applied to the nonwoven fabric in the papermaking machine by means of a size press (see also example 2). This means that the microcapsules do not form their own layer but are distributed uniformly through the layer thickness in the paper nonwoven.

When staple fibers are used, that is to say fibers which are out from endless fibers, ethylene phenyl acetate can be introduced into the hollow fibers at certain intervals in the form of dividing transverse walls, in order that not too much phase change material runs out during cutting.

The hollow fibers used can be synthetic fibers. The hollow fibers having the phase change material can be bonded in the same or similar way to the natural fiber layer 11, as illustrated in FIGS. 2 to 4.

Figure 6:
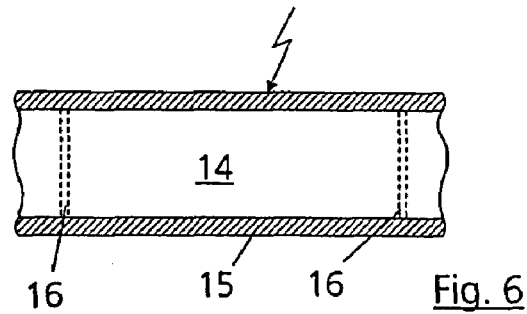
FIG. 6 shows a partial longitudinal section through a microfiber.

In FIG. 6 a section of a fiber 13b is illustrated in a highly enlarged illustration as a hollow fiber in longitudinal section, in the interior of which there is likewise the phase change material 14. The sheath of the hollow fiber can be composed of polyester, polyamide or the like. Two intermediate walls 16 of ethylene phenyl acetate are shown in a dashed representation, in order that not too much phase change material 14 runs out during the formation of staple fibers. Reference is made to U.S. 2003/0035951 A1 with respect to further details.

EXAMPLES

The improvement of the tea infusion can be demonstrated with the aid of extinction measurement. For this measurement, teabags were produced from the material according to the invention at 13 g/m² and provided with different proportions of fibers or microcapsules having phase change material. These bags were filled with about 2 g black tea and had a specific quantity of boiling water poured over them. With the aid of a pumping unit, the colored tea produced was led in circulation through a photometer. A light beam at a wavelength of 445 nm shone through the liquid pumped through. The measured extinction was recorded digitally. The extinction is a measure of the attenuation of a beam by the absorption in the liquid. The higher the extinction, the darker is the tea infusion.

Figure 7:
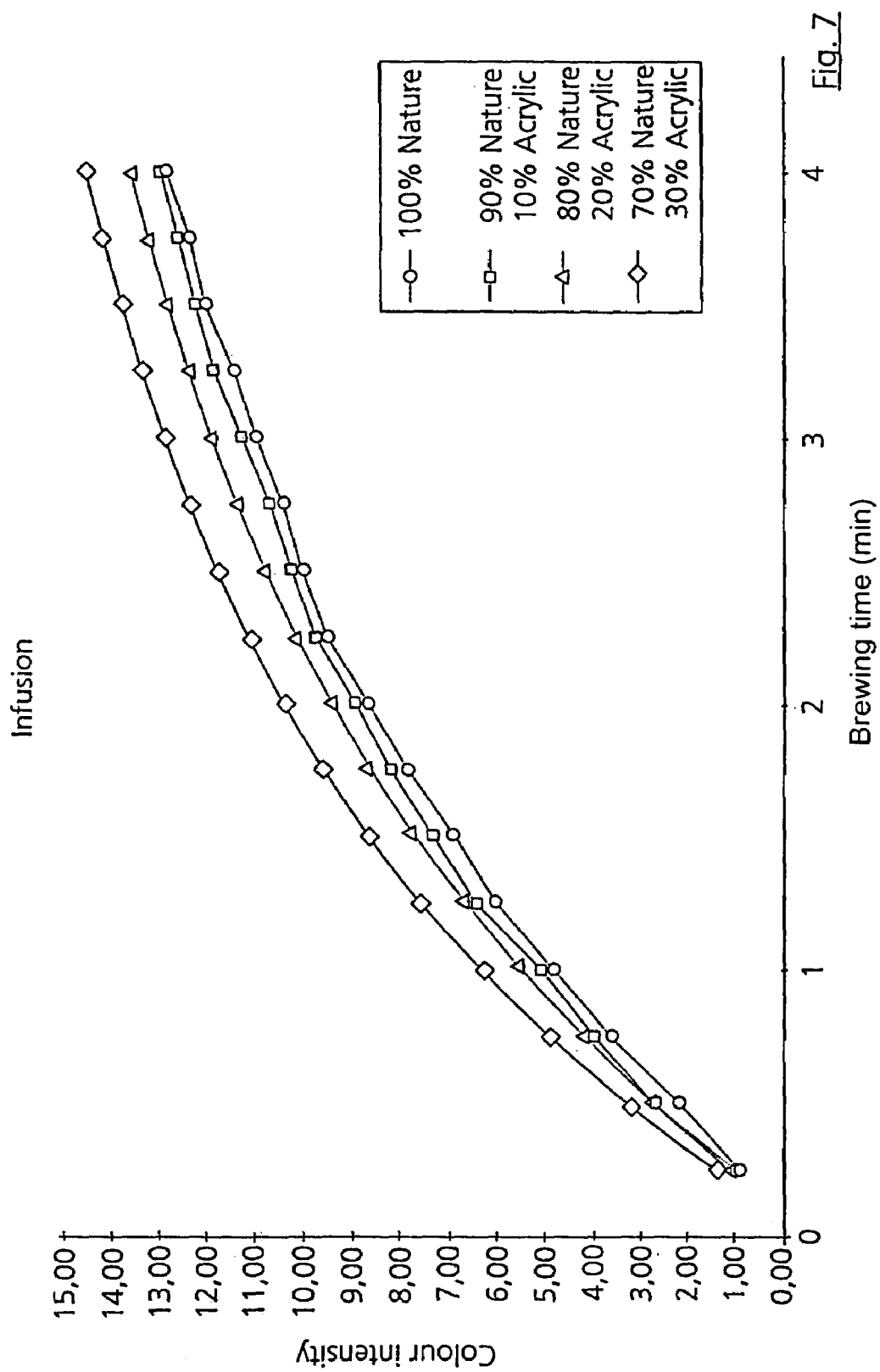
FIG. 7 shows a graph relating to trials as compared with the prior art.

1. In the fiber mixture for a conventional, non-heat-sealable teabag paper, 10%, 20% and 30% acrylic fibers with microcapsules in the interior of which there was a phase change material were added. The fiber dimensions were 2 dtex, 2 to 5 mm. From these mixtures, paper sheets at 13 g/m² wet strength were produced. Teabags were fabricated from these sheets and filled with 2.0 g black tea. Following the measurement outlined above, the extinction was measured as a function of the brewing time. An untreated teabag was tested as a blind sample. FIG. 7 shows the result of the measurement, from which it emerges clearly that, as the percentage of acrylic fibers with microcapsules increases, the color intensity of the tea becomes considerably more intense as compared with 100% natural fibers.

2. In a formulation with 17.4% Acronal®, in each case 1, 5 and 10% by weight of microcapsules having phase change material were introduced. With the aid of a doctor, a non-heat-sealable teabag paper at 13 g/m² was coated with the formulations. Curing of the material at 120° C. for 10 minutes was then carried out. Double-chamber teabags were fabricated from the impregnated papers and filled with 2.0 g black tea.

As already described in the first trial, the extinction of the teabags as a function of the brewing time was measured. An untreated teabag was tested as a blind sample.

Figure 8:
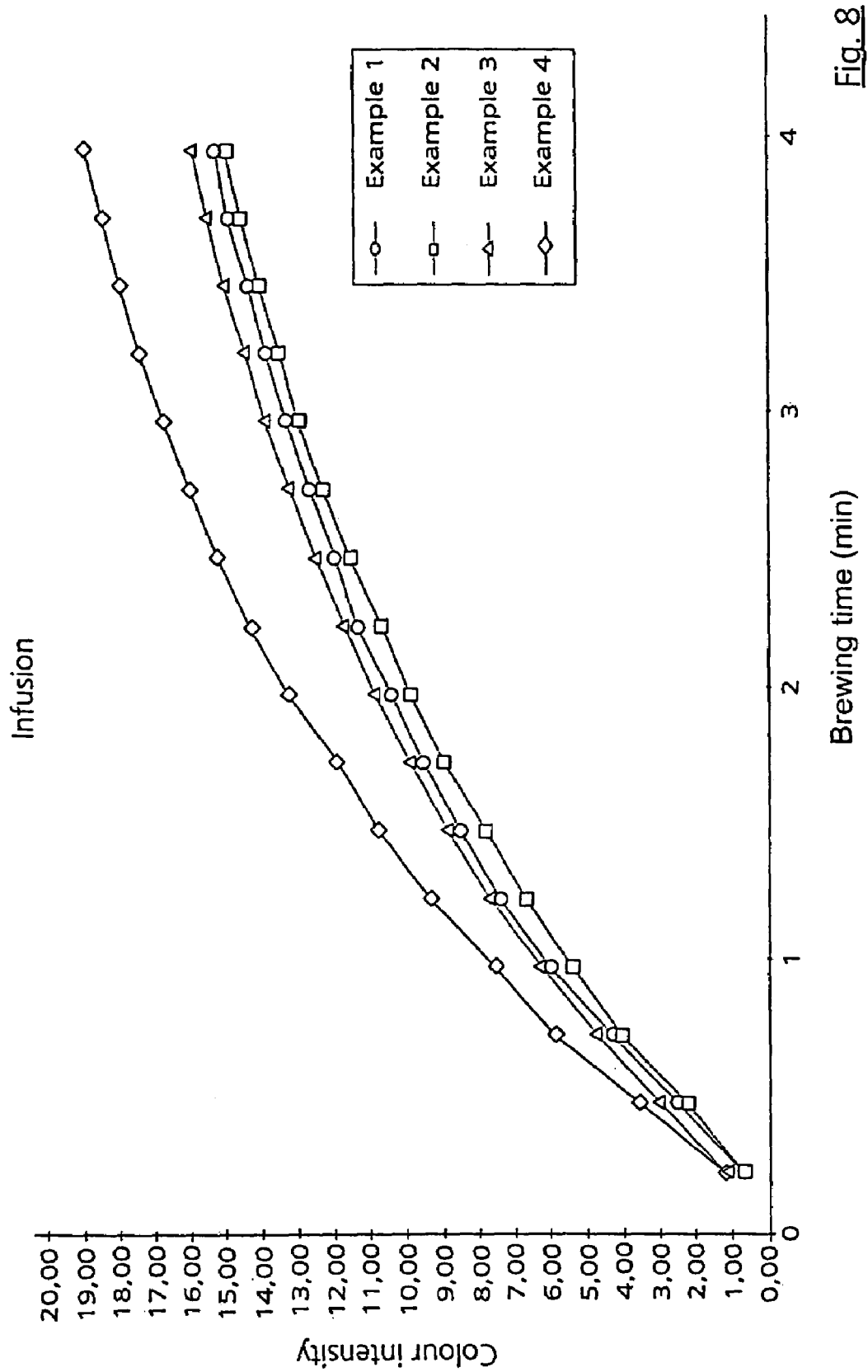
FIG. 8 shows a further graph relating to trials as compared with the prior art.

FIG. 8 shows the result of the measurement.

Explanation:
Sample 1 Blind sample
Sample 2 1% microcapsules having phase change material
Sample 3 5% microcapsules having phase change material
Sample 4 10% microcapsules having phase change material.

It also clearly emerges from this trial that, with an increase in the microcapsules having phase change material, the color intensity of the tea becomes considerably more intense. As compared with the blind sample without microcapsules, the color intensity obtained after 4 minutes brewing time in the case of the blind sample is already reached after 2 minutes, that is to say in half the time.

The invention claimed is:

1. A filter material for infused beverages comprising at least one fiber layer and a plurality of microcapsules or microfibers dispersed therein, each of said microcapsules comprising a protective sheath and a phase change material within an interior of said sheath, and each of said microfibers comprising a hollow fiber and said phase change material filled therein; said phase change material having a phase change temperature in a range from 0 to 120° C. for a phase change from solid to liquid, said filter material having a weight per unit area between 8 and 90 g/m², wherein when used in making an infused beverage, said filter material enables a substantially faster release of an infused material through said filter material than said fiber layer without said microcapsules or said microfibers.

2. The filter material of claim 1, wherein said phase change temperature of said phase change material is in a range from 50 to 100° C.

3. The filter material of claim 1, wherein said phase change material is hydrocarbons.

4. The filter material of claim 1, wherein said phase change material is paraffinic hydrocarbons.

5. The filter material of claim 1, wherein said phase change material is hydrated salts, waxes, oils, fatty acids, fatty acid esters, dibasic acids and esters, primary alcohols, polyhydric alcohols, clathrates, semi-clathrates, stearic anhydrides, ethylene carbonate, polymers or mixtures thereof.

6. The filter material of claim 1, wherein said microcapsules or microfibers comprise therein more than one phase change materials, each having said phase change temperature in a range from 0 to 120° C.

7. The filter material of claim 1, wherein said microcapsules or microfibers are bonded in said fiber layer by a binder.

8. The filter material of claim 7, wherein said binder is polyacrylate (Acronal®).

9. The filter material of claim 1, wherein said filter material comprises said microcapsules or microfibers fibers in an amount of between 1 and 70% by weight, based on the weight per unit area of said filter material.

10. The filter material of claim 1, wherein said filter material comprises said microcapsules or microfibers in an amount of between 2 and 30% by weight, based on the weight per unit area of said filter material.

11. The filter material of claim 1, wherein said filter material comprises said microcapsules or microfibers in an amount of between 3 and 10% by weight, based on the weight per unit area of said filter material.

12. The filter material of claim 1, wherein said filter material has a weight per unit area between 10 and 25 g/m².

13. The filter material of claim 1, wherein said fiber layer is a natural fiber layer.

14. The filter material of claim 13, wherein said natural fiber layer is composed of natural fibers, softwood pulp, hardwood pulp, abaca fibers or a mixture thereof.

15. The filter material of claim 13, wherein said filter material further comprises a second synthetic fiber layer fused to said natural fiber layer.

16. The filter material of claim 15, wherein said synthetic fiber layer is a heat-sealable fiber.

17. A process for the production of said filter material of claim 1, wherein said at least one fiber layer is made on a papermaking machine, and then said microcapsules or microfibers containing therein one or more phase change materials are bonded to said at least one fiber layer using a binder.

18. The process of claim 17, wherein said microcapsules or microfibers are applied to said at least one fiber layer in an application device of said papermaking machine in an amount of from 2 to 30% by weight, based on the weight per unit area of said filter material.

19. The process of claim 17, wherein said microcapsules or microfibers are applied to said at least one fiber layer in an application device of said papermaking machine in an amount of from 3 to 10% by weight, based on the weight per unit area of said filter material.

20. The process of claim 17, wherein a second synthetic fiber layer is then fused to said at least one fiber layer on papermaking machine.

21. A filter bag or filter cone for infused beverages made of a filter material comprising at least one fiber layer and a plurality of microcapsules or microfibers dispersed therein, each of said microcapsules comprising a protective sheath and a phase change material within an interior of said sheath, and each of said microfibers comprising a hollow fiber and said phase change material filled therein; said phase change material having a phase change temperature in a range from 0 to 120° C. for a phase change from solid to liquid, said filter material having a weight per unit area between 8 and 90 g/m², wherein when used in making an infused beverage, said filter bag or filter cone enables a substantially faster release of an infused material Through said filter material than said fiber layer without said microcapsules or said microfibers.

22. A method of fast production of an infused beverage using a filter material comprising:
(1) placing an infused material next to said filter material, said filter material comprising at least one fiber layer and a plurality of microcapsules or microfibers dispersed therein, each of said microcapsules comprising a protective sheath and a phase change material within an interior of said sheath, and each of said microfibers comprising a hollow fiber and said phase change material filled therein; said phase change material having a phase change temperature in a range from 0 to 120° C. for a phase change from solid to liquid, said filter material having a weight per unit area between 8 and 90 g/m², and
(2) adding a liquid having a temperature from 0 to 120° C. to said infused material, wherein said filter material enables a fast release of an infused material through said filter material.

23. The method of claim 22, wherein said phase change temperature of said phase change material is in a range from 50 to 100° C., and said liquid has a temperature from 50 to 100° C.

24. The filter material of claim 1, wherein said protective sheath of said microcapsules is polyacrylate.

25. The filter bag or filter cone of claim 21, wherein said protective sheath of said microcapsules is polyacrylate.

* * * * *

UNITED STATES PATENT AND TRADEMARK OFFICE
CERTIFICATE OF CORRECTION

PATENT NO. : 7,311,209 B2
APPLICATION NO. : 10/937045
DATED : December 25, 2007
INVENTOR(S) : Martin Bentz and Danny H. Meger It is certified that error appears in the above-identified patent and that said Letters Patent is hereby corrected as shown below:

Column 3, line 1, change "micro. Gulf Streams" to --micro Gulf Streams--

Column 3, line 20, change "U.S. 2003/0035951 A1, U.S. 2003/C035951 A1" to --U.S. 2003/0035951 A1, U.S. 2003/0035951 A1--

Column 3, line 33, change "per linit area" to --per unit area--

Column 4, line 56, change "different chase changes" to --different phase changes--

Column 8, line 2, change "material Through" to --material through--

Signed and Sealed this

Eighteenth Day of August, 2009

David J. Kappos
*Director of the United States Patent and Trademark Office*